US011961656B2

(12) United States Patent
Minteer et al.

(10) Patent No.: US 11,961,656 B2
(45) Date of Patent: Apr. 16, 2024

(54) METHOD OF MANUFACTURING A CURRENT TRANSFORMER

(71) Applicant: Schweitzer Engineering Laboratories, Inc., Pullman, WA (US)

(72) Inventors: Timothy M. Minteer, Pullman, WA (US); Eric M. Sawyer, Moscow, ID (US); David Kenny, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 881 days.

(21) Appl. No.: 16/991,464

(22) Filed: Aug. 12, 2020

(65) Prior Publication Data

US 2020/0373078 A1 Nov. 26, 2020

Related U.S. Application Data

(62) Division of application No. 15/791,050, filed on Oct. 23, 2017, now Pat. No. 10,777,349.

(51) Int. Cl.

| | |
|---|---|
| ***H01F 7/06*** | (2006.01) |
| ***H01F 27/24*** | (2006.01) |
| ***H01F 27/28*** | (2006.01) |
| ***H01F 27/32*** | (2006.01) |
| ***H01F 38/30*** | (2006.01) |
| ***H01F 41/02*** | (2006.01) |
| ***H01F 41/06*** | (2016.01) |
| *H01F 41/00* | (2006.01) |

(52) U.S. Cl.

CPC ........... *H01F 27/325* (2013.01); *H01F 27/24* (2013.01); *H01F 27/2823* (2013.01); *H01F 38/30* (2013.01); *H01F 41/02* (2013.01); *H01F 41/0206* (2013.01); *H01F 41/06* (2013.01); *H01F 2038/305* (2013.01); *H01F 41/00* (2013.01)

(58) Field of Classification Search

CPC .... H01F 27/24; H01F 27/2823; H01F 27/325; H01F 38/30; H01F 41/0206; H01F 41/061; H01F 2038/305

See application file for complete search history.

(56) References Cited

U.S. PATENT DOCUMENTS

2007/0124915 A1* 6/2007 Ekelof .................... H01F 41/08 29/737
2008/0055814 A1* 3/2008 Varga ...................... H01F 38/08 445/23
2008/0157914 A1* 7/2008 Pokharna ............. H05B 41/042 29/606
2009/0096562 A1* 4/2009 Nakadai .................. H01F 27/40 336/67
2013/0200971 A1* 8/2013 Crutcher ................ H01F 27/24 29/602.1

* cited by examiner

*Primary Examiner* — Paul D Kim
(74) *Attorney, Agent, or Firm* — Stoel Rives LLP; Richard M. Edge

(57) ABSTRACT

A current transformer includes a pre-formed core forming a closed loop with a flexible axially wound secondary winding. A continuous length of wire is axially coiled around a flexible bobbin to form a secondary winding. The resulting secondary winding may be slid onto the closed loop of the pre-formed core. The flexibility of the axially wound secondary winding facilitates conformity to a non-linear shape of the pre-formed core.

12 Claims, 9 Drawing Sheets

METHOD OF MANUFACTURING A CURRENT TRANSFORMER

RELATED APPLICATION

This application claims priority under 35 U.S.C. §§ 120 and 121 as a divisional application of U.S. patent application Ser. No. 15/791,050 filed on 23 Oct. 2017, now U.S. Pat. No. 10,777,349, naming Timothy M. Minteer, Eric M. Sawyer, and David Kenny as inventors and titled "Current Transformer with Flexible Secondary Winding" which is incorporated herein by reference in its entirety.

TECHNICAL FIELD

The present disclosure relates generally to current transformers. Specifically, the present disclosure relates to a current transformer with a flexible axially-wound secondary winding.

BRIEF DESCRIPTION OF THE DRAWINGS

The written disclosure herein describes illustrative embodiments that are non-limiting and non-exhaustive. Reference is made to certain of such illustrative embodiments that are depicted in the figures described below.

DETAILED DESCRIPTION

Figure 1:
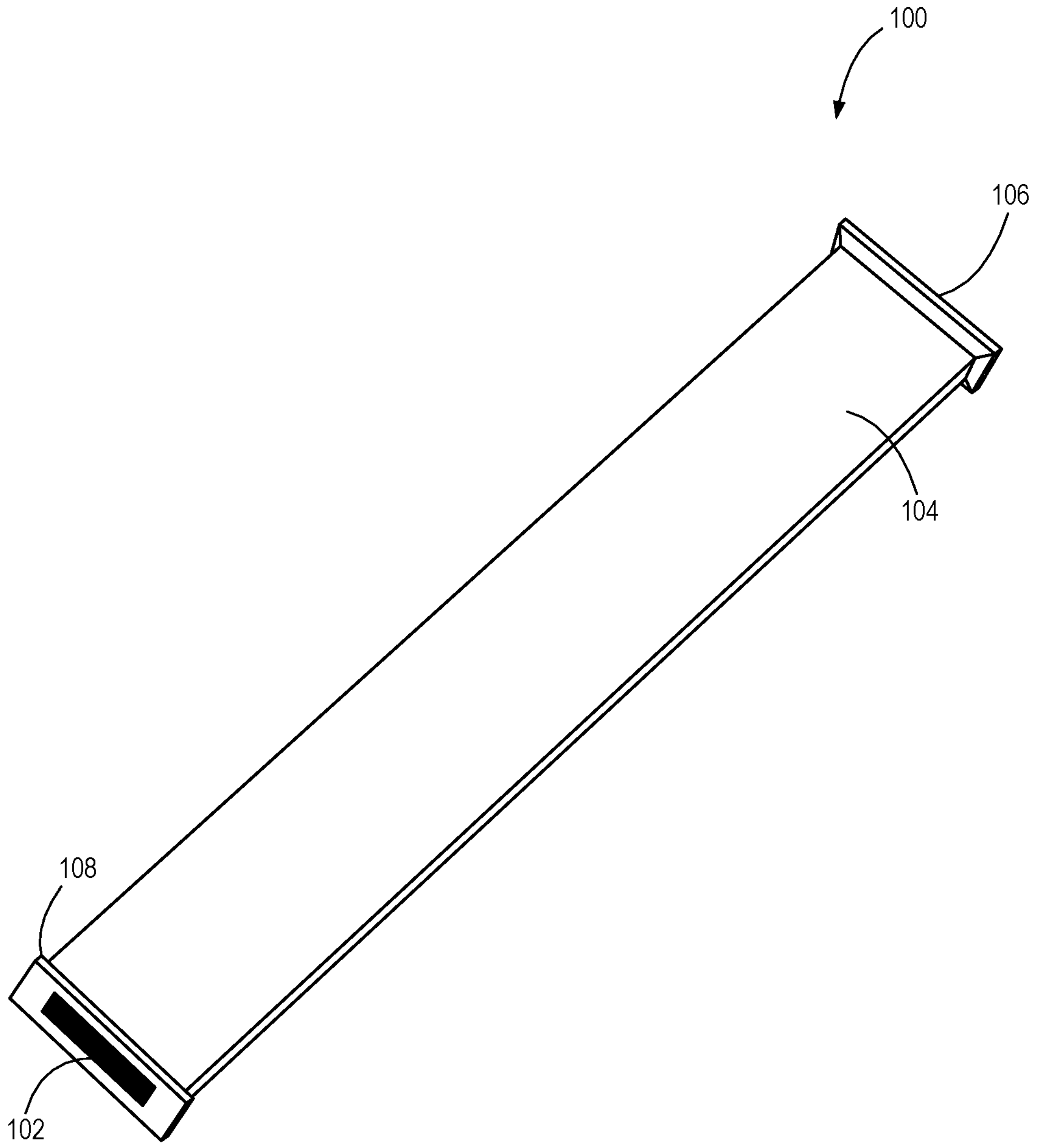
FIG. 1 illustrates a perspective view of a flexible bobbin, according to one embodiment.

This disclosure describes a current transformer with a flexible axially wound secondary winding and methods to manufacture such a current transformer. A current transformer transfers electrical energy between two circuits through electromagnetic induction. The current transferred to a secondary circuit by the current transformer is proportional to the current on a primary circuit. The proportionality facilitates safe and accurate measurement of large currents. For example, a current transformer placed on a high voltage power line produces a smaller current that can be measured allowing the current on the high voltage power line to be calculated using the proportionality of the current transformer.

An imperfect coupling between a current transformer and a power line results in secondary leakage inductance. The secondary leakage inductance results in less reliable measurements. The shape and winding of the current transformer may be constructed to reduce secondary leakage inductance. For example, a current transformer with a toroidal core and a secondary winding evenly distributed around the entire core produces little secondary leakage inductance. Toroidal current transformers generally have a very low secondary leakage inductance because of the even winding distribution. The burden of the secondary circuit primarily consists of the secondary winding resistance and any sensing burden resistor since the impedance of the secondary leakage inductance at the power system frequency is much lower than the winding resistance.

However, an evenly wound toroidal current transformer cannot be opened to be placed on a primary conductor, making this solution not feasible for measurements of pre-installed distribution lines. To allow a current transformer to be placed on a distribution line, some current transformers feature an opening in the core. For example, some current transformers are configured as a split ring to allow an installer to open the current transformer and place it on a primary conductor. Similar to the toroidal current transformer, to reduce secondary leakage inductance, the windings must be evenly distributed around the core.

The evenly distributed winding introduces additional complexity for current transformers. For example, a high number of secondary windings on a toroidal core requires a toroid winding machine which increases the cost of winding.

To lower the cost, some current transformers have a single secondary winding on one of the core sides. The lower cost secondary winding may be axially wound on a plastic bobbin and placed on the core before the core is further formed. Disadvantageously, the single winding on only a portion of the core results in a high secondary leakage inductance. To reduce secondary leakage inductance, additional secondary windings would be needed which would increase the cost.

The impedance of the secondary leakage inductance at power system frequency can be on the same order or higher than the combination of the secondary winding resistance and sense resistance. The higher secondary leakage inductance introduces a sizable error in the effective turns ratio of the current transformer. The effective turns ratio error is further impacted by part to part variance in the gap (where the current transformer's core opens to fit around the primary conductor), temperature changes impacting the current transformer's mutual inductance, and placement of the primary conductor.

Disclosed herein are embodiments of current transformers incorporating a flexible axial wound single secondary winding to limit secondary leakage inductance (low-leakage flexible CT). In some embodiments, a low-leakage flexible CT comprises a pre-formed core, a flexible bobbin, and an axially wound secondary winding around the flexible bobbin. The flexible bobbin may remain flexible even with secondary winding.

The flexibility allows the bobbin and secondary winding to conform to curves in the pre-formed core, facilitating manufacturing of a low cost current transformer featuring a curved secondary winding. For example, in some embodiments, the flexible bobbin is made out of a plastic material (such as a natural rubber, paper, cardboard, synthetic polymer, or the like), allowing it to be flexible even after the secondary turns are axially wound on the bobbin. The bobbin and the secondary winding may be slid onto the pre-formed core, forcing the bobbin and secondary winding to conform to the shape of the pre-formed core and transforming a linear secondary winding to a curved secondary winding. In some embodiments, the secondary winding may span the length of the pre-formed core. For example, a core may be formed into a toroidal shape, and the secondary winding may conform to the shape of the toroidal core, thereby simulating a toroidal current transformer without the need of a toroidal winding machine. In other embodiments, the secondary winding may encompass a portion of the core, and be strategically placed in relation to the primary conductor to minimize the secondary leakage inductance. Thus, the low-leakage flexible CT may give a performance that approaches a toroidal current transformer at the lower cost of a single axially wound secondary winding.

As used herein, the phrases “coupled to,” “communicatively coupled to,” and “in communication with” are broad enough to refer to any suitable coupling or other form of interaction between two or more components, including electrically, mechanical, fluid, and thermal interaction. Two components may be coupled to each other even though there may be intermediary devices between the two components.

A low-leakage flexible CT may provide a current to a protection relay or relay for monitoring. The protection relay or relay can open and/or close one or more circuits electromechanically or electronically. A relay may protect distribution or transmission circuits by tripping and closing a breaker under abnormal conditions. Protective relays can prevent equipment damage by detecting electrical abnormalities, including an arc flash event, faults, unbalance conditions, overcurrent conditions, power swing conditions, and the like.

An intelligent electronic device (IED), which may be used for monitoring, protecting, and/or controlling industrial and utility equipment, such as in electric power delivery systems, may include a low-leakage flexible CT. As used herein, an IED may refer to any one or combination of a central processing unit (CPU)-based relay and/or protective relay, a communication processor, a digital fault recorder, a phasor measurement unit (PMU), a phasor measurement and control unit (PMCU), a phasor data concentrator (PDC), a wide area control system (WACS), a relay with phasor measurement capabilities, a wide area protection system (WAPS), a Supervisory Control and Data Acquisition (SCADA) system, a system integrity protection scheme, or any other device capable of monitoring and/or protecting an electrical power system. The term “IED” may be used interchangeably to describe an individual IED or a system comprising multiple IEDs.

Embodiments may be understood by reference to the drawings, wherein like parts are designated by like numerals throughout. The components of the embodiments as generally described and illustrated in the figures herein can be arranged and designed in a wide variety of different configurations. Thus, the following more detailed description of various embodiments, as represented in the figures, is not intended to limit the scope of the present disclosure, but is merely representative of various embodiments. While various aspects of the embodiments are presented in drawings, the drawings are not necessarily drawn to scale unless specifically indicated. In addition, the steps of a method do not necessarily need to be executed in any specific order, or even sequentially, nor need the steps be executed only once, unless otherwise specified.

FIG. 1 illustrates a perspective view of a flexible bobbin 100, according to one embodiment. The flexible bobbin 100 provides a structure to axially wind a secondary winding and mount the secondary winding on a pre-formed core. As shown, in some embodiments, the flexible bobbin 100 is one continuous member. The continuity of the flexible bobbin 100 may facilitate a single secondary winding. The single secondary winding may include one or more layers of winding. The flexible bobbin 100 may be manipulated to take the shape of any pre-formed core.

In some embodiments, the material of the flexible bobbin 100 allows it to conform to the shape of pre-formed core. For example, the flexible bobbin 100 may be made of an elastic material such as rubber or other elastomers. Additionally, the flexible bobbin 100 may be made of non-elastic materials that bend such as cardboard.

Further, the shape or features of the flexible bobbin 100 may facilitate manipulation of the flexible bobbin 100. For instance, the flexible bobbin 100 may be a lattice. A lattice flexible bobbin may maintain the structure of the bobbin, decrease the material used, and add a greater flexibility. In some embodiments, the flexible bobbin 100 may incorporate a series of weakened features to facilitate bending. For instance, a series of grooves and/or slots along the length of the flexible bobbin 100 may create flexing points.

The flexible bobbin 100 may comprise a duct 102 and a winding track 104. As shown, the duct 102 extends through the length of the flexible bobbin 100. Stated otherwise, the flexible bobbin 100 and/or the winding track 104 may define the duct 102 through a length of the flexible bobbin 100. The duct 102 may be a channel extending from one end of the flexible bobbin 100 to another end of the flexible bobbin 100 to receive or otherwise accommodate a core. Thus, the duct 102 may encompass a portion of a pre-formed core. The duct 102 comprises openings on both ends of the winding track 104, allowing the flexible bobbin 100 to slide onto the pre-formed core. In some embodiments, the duct 102 may comprise a lubricated coating to reduce the friction between the duct 102 and the pre-formed core. The winding track 104 provides a path for a wire to be coiled around the flexible bobbin 100. The winding track 104 may comprise two retention edges 106, 108 to maintain a coiled wire within the winding track 104. The winding track 104 may provide a separation between the pre-formed core and a secondary winding.

Figure 2:
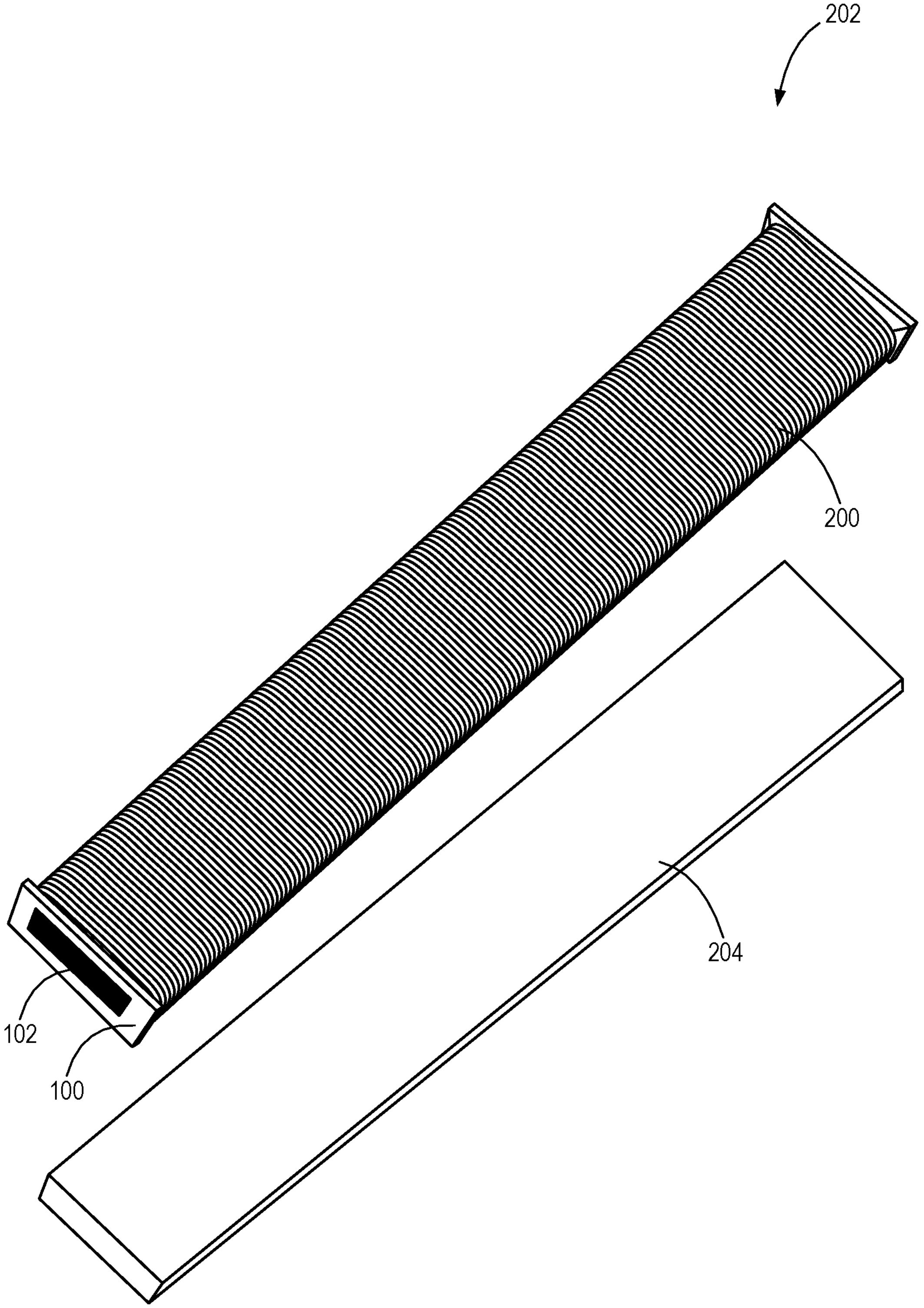
FIG. 2 illustrates a flexible secondary winding for a current transformer, according to one embodiment, the flexible second winding including a continuous length of wire axially coiled around the flexible bobbin of FIG. 1.

FIG. 2 illustrates a flexible secondary winding 202 for a current transformer, according to one embodiment, the flexible second winding including a continuous length of wire 200 axially coiled around the flexible bobbin 100 of FIG. 1, according to one embodiment. As the continuous length of wire 200 is axially wound, a toroidal winding machine is not necessary. Further, the single track of the flexible bobbin 100 facilitates even distribution of the continuous length of wire. A spacer 204 may be inserted into the duct 102 when the wire 200 is axially wound to preserve the opening.

The flexible secondary winding 202 of the continuous length of wire 200 and the flexible bobbin 100 remains flexible. This flexibility allows the continuous length of wire 200 and the flexible bobbin 100 to slide onto a pre-formed core and conform to a non-linear shape. For instance, the continuous length of wire 200 and the flexible bobbin 100 may follow a curve of the magnetic core. The flexibility of the flexible secondary winding 202 may be adjusted as needed based on the winding pattern and the material used. A sparse secondary winding may be more flexible than a dense secondary winding. Additionally, the gauge of the wire used in the continuous length of wire 200 may affect the flexibility of the flexible secondary winding 202. For example, in an embodiment where the flexible secondary winding 202 is to slide along a small toroidal shape, the continuous length of wire 200 may comprise a minimal number of windings to facilitate sufficient flexibility.

In one embodiment, a flexible secondary winding may include a flexible bobbin comprising a winding track, the flexible bobbin forming a duct to facilitate placement on a pre-formed core; a continuous length of wire axially coiled around the flexible bobbin, wherein the flexible bobbin with the continuous length of wire axially coiled around selectively flexes into non-linear shapes.

Figure 3:
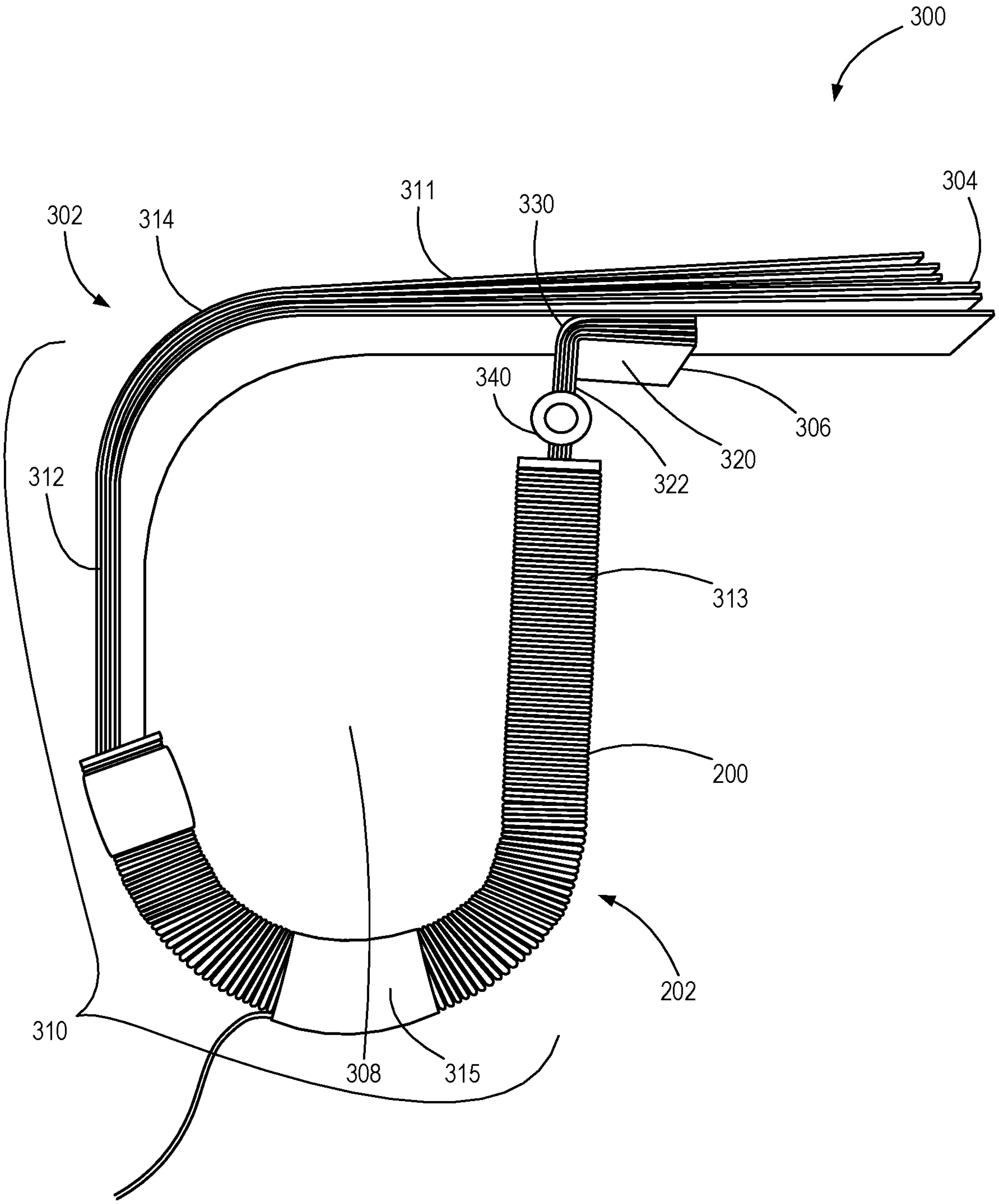
FIG. 3 illustrates a current transformer with a flexible axially wound secondary winding, according to one embodiment.

FIG. 3 illustrates a low-leakage flexible CT 300 with an axially wound flexible secondary winding 202, according to one embodiment. As shown, the low-leakage flexible CT 300 comprises a rounded pre-formed core 302 and the flexible secondary winding 202. The flexible secondary winding 202 includes a continuous length of wire 200 coiled around the flexible bobbin 100 (shown in FIG. 1).

The rounded pre-formed core 302 forms a closed loop 308. A primary conductor within the closed loop 308 of the rounded pre-formed core 302 carrying an alternating current produces an alternating magnetic field in the rounded pre-formed core 302. The alternating magnetic field produces a current in the continuous length of wire 200. The current in the continuous length of wire 200 is proportional to the current of the primary conductor.

The rounded pre-formed core 302 is configured to selectively open the closed loop 308 to accommodate installation on a primary conductor. In some embodiments, the rounded pre-formed core 302 may be flexible such that a first end 304 and a second end 306 of the rounded pre-formed core 302 may be pried apart to form an opening 330. The construction of the rounded pre-formed core 302 may affect core flexibility.

For example, in one embodiment the rounded pre-formed core 302 comprises a group of laminates that forms a rigid or semi-rigid core. The flexibility of each laminate allows the closed loop 308 to be selectively opened. The group of laminates may be forced closed by an installer to obtain the original position. In some embodiments, the laminates may be tempered to cause each laminate to return to the original shape after being flexed into an open position. In some embodiments, the rounded pre-formed core 302 comprises a hinge 340 to allow the closed loop to be selectively opened and closed.

The rounded pre-formed core 302 may include an arched portion 310 and an angled portion 320. The angled portion 320 selectively couples to the arched portion 310 to form the closed loop 308. As shown, the angled portion 320 and arched portion 310 may include planes that are flush with each other to create contact. The planes may be held together by the shape and resilience of the rounded pre-formed core 302. In some embodiments, a mating piece may couple the angled portion 320 and arched portion 310. A mating piece may include, but is not limited to, a bolt, clamp, pin, rod, and/or strap.

The flexible secondary winding 202 is introduced onto the rounded pre-formed core 302 along the arched portion 310, and conform to the shape of a portion of the arched portion 310. In some embodiments, the arched portion 310 is a continuous curve. However, as shown, in some embodiments the arched portion 310 comprises relatively straight pieces (e.g., introducer 311, and rails 312 and 313) coupled via gradual corners 314, 315. In some embodiments, the flexible secondary winding 202 may encompass the entire rounded pre-formed core 302. In other embodiments, only a portion of the rounded pre-formed core 302 is encompassed to maintain flexibility of the low-leakage flexible CT 300 along the uncovered rounded pre-formed core 302.

The introducer 311 facilitates initial placement of the flexible secondary winding 202 on the rounded pre-formed core 302. As shown, in some embodiments, the introducer 311 comprises a straight section of the rounded pre-formed core 302. The introducer 311 may overhang the angled portion 320. The overhang provides a grip for an installer to force the rounded pre-formed core 302 open. Additionally, the overhang allows an initial placement of the flexible bobbin 100 without opening the rounded pre-formed core 302.

The gradual corners 314, 315 are curved sections of the rounded pre-formed core 302 to guide the flexible secondary winding 202 along different segments of the arched portion 310. For example, as the flexible secondary winding 202 is forced along the introducer 311, the first gradual corner 314 guides the flexible secondary winding 202 to the first rail 312. The gradual corners 314, 315 also force the flexible secondary winding 202 to transform from a linear shape to a non-linear shape. For instance, as shown, the second gradual corner 315 forces the flexible secondary winding 202 into a curved configuration.

The rails 312, 313, like the second gradual corner 315, provide a structure to shape the flexible secondary winding 202. For example, as shown, the rails 312, 313 and the second gradual corner 315 may cause the flexible secondary winding 202 to flex into a "J" shape. The shaping structure of the rails 312, 313 and the second gradual corner 315 allows the formerly linear flexible secondary winding 202 to surround additional sides of a primary conductor, which may reduce secondary leakage inductance.

The angled portion 320 may prevent the flexible secondary winding 202 from sliding off of the second end 306 of the rounded pre-formed core 302. For instance, the flexible secondary winding 202 may lack sufficient flexibility to slide over a sharp angle 322. In other embodiments, the angled portion 320 provides resistance to additional movement of the flexible secondary winding 202, but still allows removal of the flexible secondary winding 202 at the second end 306.

In some embodiments, the angled portion 320 may facilitate placement of the flexible secondary winding 202 on the introducer 311. For instance, the angled portion 320 may have a sloped lip that catches a flexible bobbin 100 sliding along the introducer 311. As the flexible bobbin 100 slides along the sloped lip, the closed loop 308 is forced open.

Figure 4C:
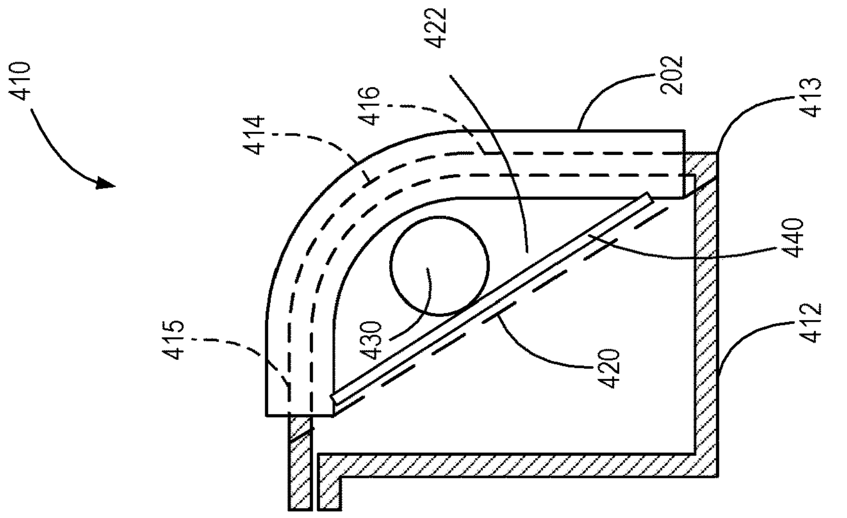
FIG. 4C illustrates a side view of a current transformer with a rectangular pre-formed core flexing an axially wound secondary winding into an "L" shape.
Figure 4B:
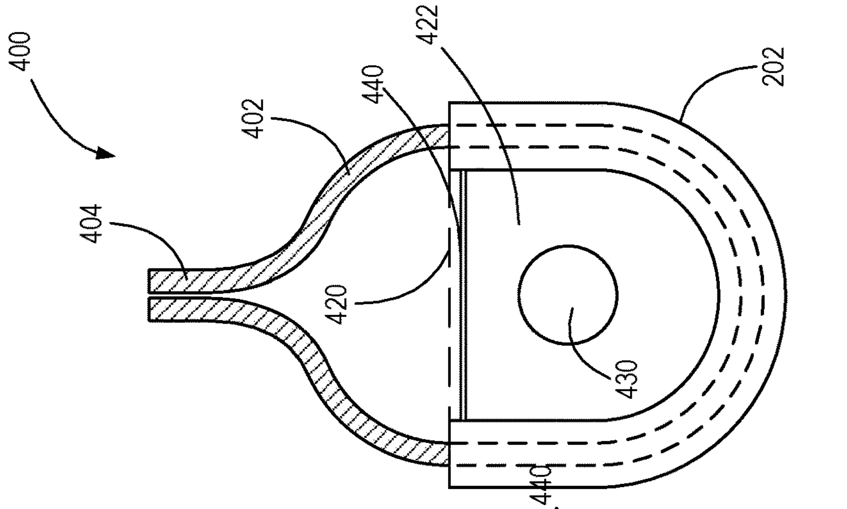
FIG. 4B illustrates a side view of a current transformer with an elliptical pre-formed core flexing an axially wound secondary winding into a "U" shape.
Figure 4A:
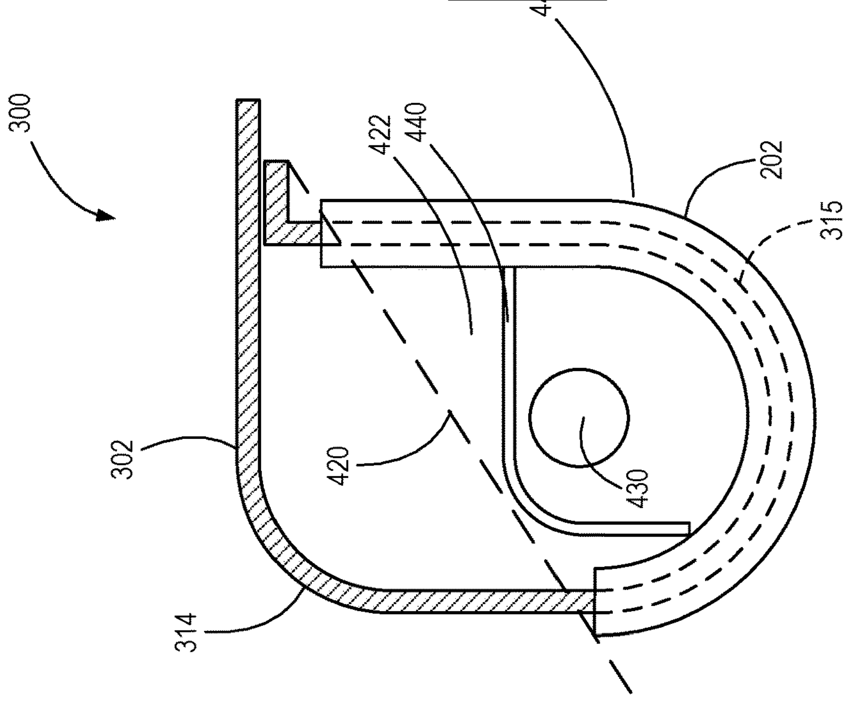
FIG. 4A illustrates a side view of a current transformer with a rounded pre-formed core flexing an axially wound secondary winding into a "J" shape.

FIGS. 4A-4C illustrate side views of low-leakage flexible CTs (300, 400, 410) with various core forms and secondary winding placement. Specifically, FIG. 4A illustrates a side view of a low-leakage flexible CT 300 with the rounded pre-formed core 302 flexing the flexible secondary winding 202 into a "J" shape. FIG. 4B illustrates a side view of a low-leakage flexible CT 400 with an elliptical pre-formed core 402 flexing the flexible secondary winding 202 into a "U" shape. FIG. 4C illustrates a side view of a low-leakage flexible CT 410 with a rectangular pre-formed core 412 flexing the flexible secondary winding 202 into an "L" shape.

As discussed with reference to FIG. 3, the rounded pre-formed core 302 of FIG. 4A features gradual corners 314, 315 to facilitate placement of the flexible secondary winding 202. The rounded pre-formed core 302 comprises two opposing flat regions (rails 312, 313) coupled by the second gradual corner 315. The flexible secondary winding 202 in FIG. 4A is placed unevenly along the two rails 312, 313, causing the flexible secondary winding 202 to form a "J" shape.

As shown, the elliptical pre-formed core 402 of FIG. 4B features an oblong shape with curved entry points 404. In some embodiments, an elliptical pre-formed core may be constructed in a toroidal or egg shape. The flexible secondary winding 202 in FIG. 4B conforms to the curvature of the elliptical shape. As shown, a first end and a second end of the flexible secondary winding 202 may be positioned at an equivalent chord of the elliptical pre-formed core 402 (e.g., at symmetrical points along the elliptical pre-formed core 402) to form a "U" shape. The chord is a secant line that forms the boundary line 420 for the elliptical pre-formed core 402.

As shown, the rectangular pre-formed core 412 of FIG. 4C features a squared shape with one rounded corner 414. The rectangular pre-formed core 412 comprises at least two transverse flat regions 415, 416 coupled by the rounded corner 414. The rounded corner 414 facilitates placement of the flexible secondary winding 202 onto the rectangular pre-formed core 412. The flexible secondary winding 202 may conform along a portion of both transverse flat regions 415, 416 and the rounded corner 414 to form an "L" shape. A squared corner 413 may prevent the flexible secondary winding 202 from sliding further along the rectangular pre-formed core 410.

A boundary line 420 is depicted on each of FIGS. 4A-C. The boundary line 420 is a secant line (from a first end of the flexible secondary winding 202 to a second end of the flexible secondary winding 202) that defines a primary coupling zone 422. The primary coupling zone 422 is the area surrounded by the flexible secondary winding 202 and the boundary line 420. The boundary line 420, as shown, is a straight line between the ends of the flexible secondary winding 202. A primary conductor 430 placed in the primary coupling zone 422 results in low secondary leakage inductance. As shown, the area of the primary coupling zone 422 may be altered based on core shape and secondary winding placement. In some embodiments, the flexible secondary winding 202 surrounds only a portion of a preformed core and conforms along a curve of the portion of the preformed core. In such embodiments, the primary coupling zone 422 is the area surrounded by the flexible secondary winding 202 and a secant line from a first end to a second end of the flexible secondary winding 202.

In some embodiments, a secondary winding covers only a partial portion of a flexible bobbin, and accordingly only a partial portion of the pre-formed core (e.g., the secondary winding does not cover the entirety of the core, though the flexible bobbin may cover all of or a greater portion of the pre-formed core). The primary coupling zone 422 may be defined within only a portion of an area bounded by the shape of the pre-formed core as defined by the secondary winding and a secant line 420 from a first end of the secondary winding to a second end of the secondary winding.

Compared to a single secondary winding place on only one side of a current transformer core, low-leakage flexible CTs (300, 400, 410) may reduce effective CT turns ratio error, reduce error from the gap variance where the core laminates open for installation on a primary conductor, reduce error from temperature variations of the CT mutual inductance, and reduce error from the placement of the primary conductor. In some embodiments, the primary conductor 430 may also be many turns. As long as all primary turns are contained within the primary coupling zone 422, then the flexible secondary winding 202 may still maintain a low-leakage inductance.

In some embodiments, the low-leakage flexible CTs (300, 400, 410) may comprise a retainer 440 configured to maintain the primary conductor 430 within the primary coupling zone 422. For example, a strap may be placed between the ends of the flexible secondary winding 202 to retain the primary conductor 430 within the primary coupling zone 422. The retainer 440 may selectively couple to the ends of the flexible secondary winding 202, allowing the retainer 440 to be installed after the flexible secondary winding 202 is placed.

Figure 5:
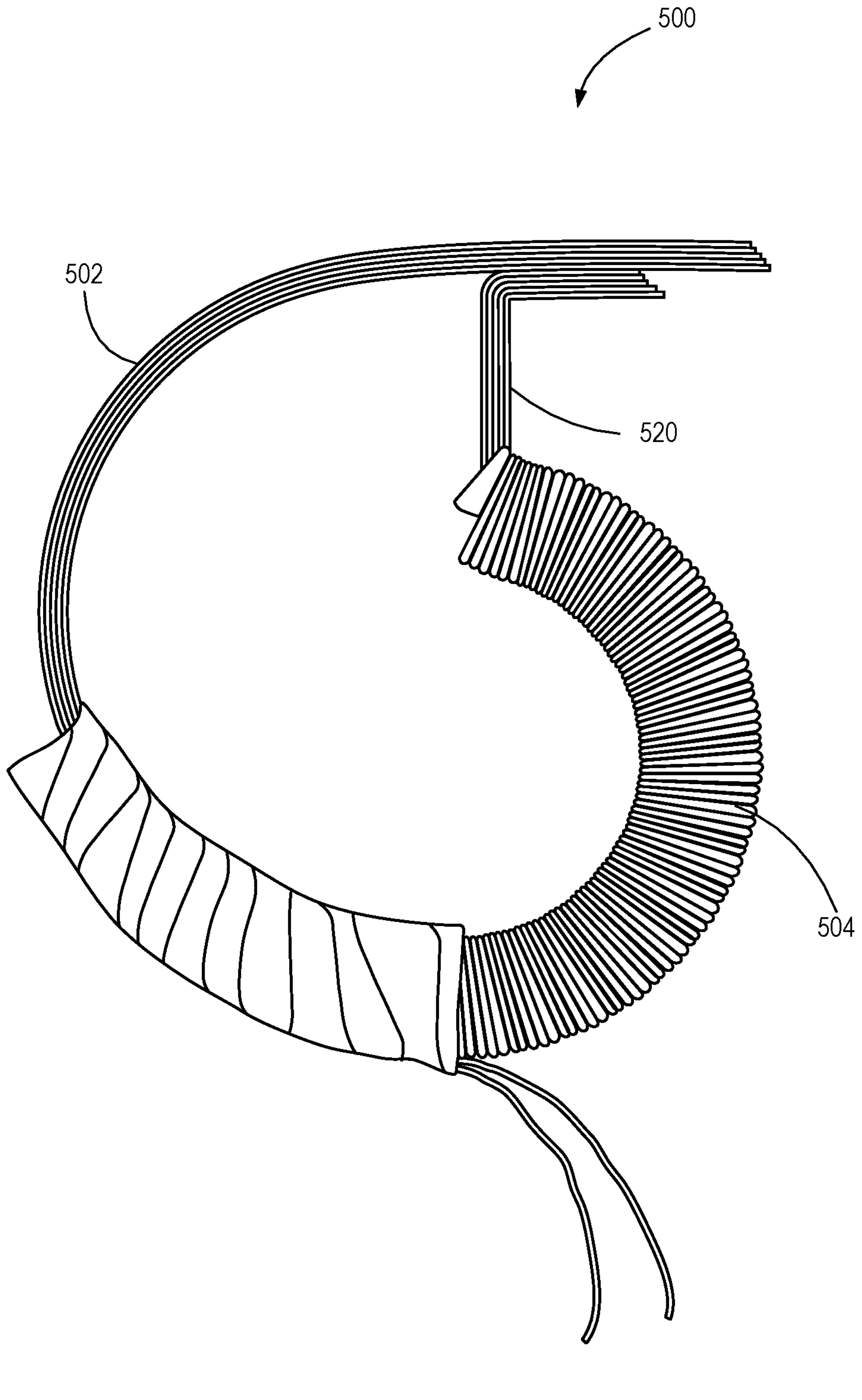
FIG. 5 illustrates a side view of a current transformer with an axially wound flexible secondary winding conforming to a spiral pre-formed core.

FIG. 5 illustrates a side view of a low-leakage flexible CT 500 with a spiral pre-formed core 502. As shown, the spiral pre-formed core 502 may wind around a center point at a continuously decreasing diameter until it reaches an angled portion 520. The pattern of the spiral pre-formed core 502 may reduce secondary leakage inductance. The pattern may also facilitate placement of the flexible secondary winding. For instance, a secondary winding 504 may flex sufficiently to follow the diameter change of the pre-formed core 502, but the angled portion 520 may prevent further movement.

Additionally, the pattern may assist in placing a primary conductor through the low-leakage flexible CT 500. For instance, the spiral may hook onto a primary conductor, allowing the low-leakage flexible CT 500 to hang on a primary conductor. In some embodiments, the diameter and resilience of the spiral may cause the low-leakage flexible CT 500 to clamp to a primary conductor that is larger than the smallest diameter of the spiral. Accordingly, the diameter of the spiral may be based on the diameter of an intended primary conductor.

Figure 6:
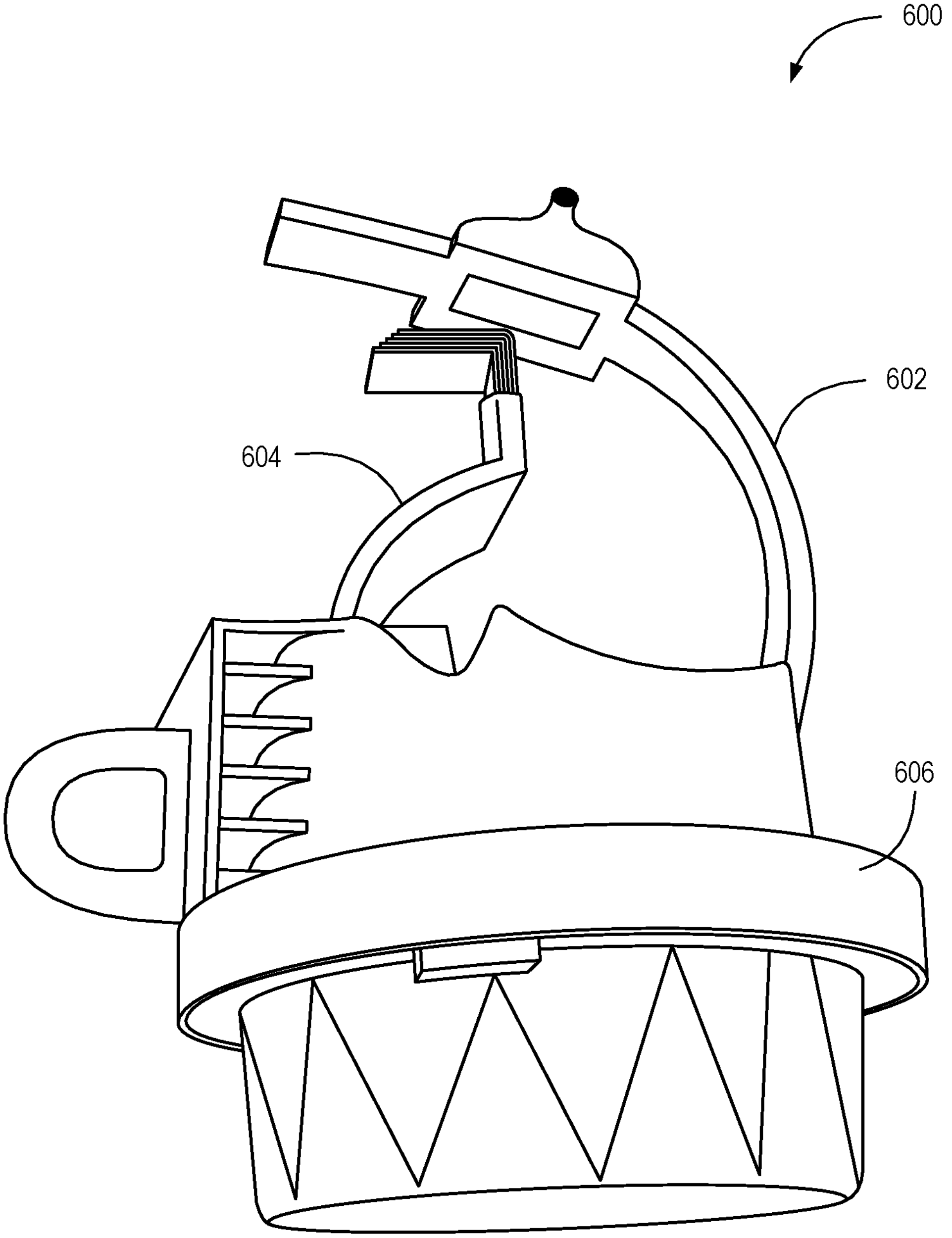
FIG. 6 illustrates a side view of an intelligent electronic device comprising an axially wound flexible secondary winding conforming to a shaped pre-formed core.

FIG. 6 illustrates a side view of an IED 600 comprising a low-leakage flexible CT 602. The low-leakage flexible CT 602 may couple to sensors in the IED 600 to monitor current on a primary conductor. The IED 600 may be a part of a distributed protection system. For example, a distributed protection system may comprise a plurality of IEDs located at various points of an electrical system. The IEDs may communicate with a receiver to coordinate an opening of a relay in the event of a fault condition.

The low-leakage flexible CT 602 is at least partially housed in a body 606 of the IED 600. The body 606 may provide protection for the low-leakage flexible CT 602. Specifically, in some embodiments, it may be desirable to protect the secondary winding 604 from environmental factors. Accordingly, the secondary winding 604 may be molded into the body 606 and/or covered with potting material. For instance, secondary winding 604 may be placed into the body 606, and then the body 606 may be filled with a liquid resin that sets hard to protect the secondary winding 604.

Figure 7:
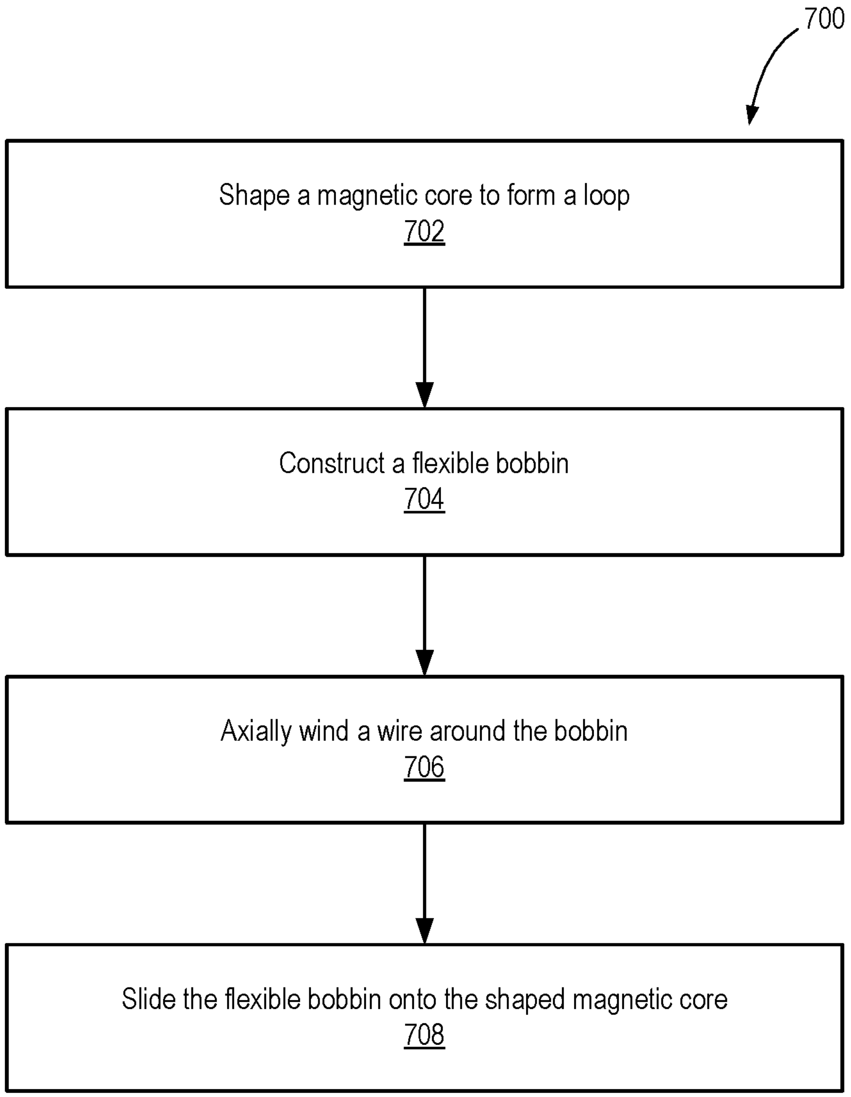
FIG. 7 illustrates a flow chart of a method for manufacturing a current transformer with a flexible bobbin.

FIG. 7 illustrates a flow chart of a method 700 for manufacturing a current transformer with a flexible bobbin. As illustrated, a manufacturer may shape 702 a pre-formed core to form a loop. In some embodiments, the pre-formed core may be an open shape (e.g., a U-shape or a J-shape) that is closable. The loop may be fashioned into a variety of shapes. For example, the loop may be rounded (e.g., FIG. 4A), elliptical (e.g., FIG. 4B), rectangular (e.g., FIG. 4C), spiral (e.g., FIG. 5), or toroidal.

The manufacturer may construct 704 a flexible bobbin. The flexible bobbin may be one continuous segment with a duct extending through the flexible bobbin. For example, in some embodiments, the manufacturer may mold the flexible bobbin from rubber into one continuous rubber member. In some embodiments, the flexible bobbin may be constructed by layering and/or sintering rubberized filament to form one continuous rubberized member.

The manufacturer may axially wind 706 a wire around the flexible bobbin. In some embodiments, a spacer is inserted in the duct of the flexible bobbin prior to axially winding the wire to maintain the duct opening. In some embodiments, the flexible bobbin may be self-supporting or formed around a supportive duct frame. For example, the flexible bobbin may comprise material resilient enough to maintain the duct during the winding.

The manufacturer may insert the shaped pre-formed core through the duct of the flexible bobbin, and slide 708 the flexible bobbin onto the shaped pre-formed core. The flexible bobbin conforms to a shape of the pre-formed core, allowing the manufacturer to place the flexible bobbin with the wire winding. Additionally, the pre-formed core maintains its shape, causing the flexible bobbin with the wire winding to adapt to a non-linear shape, resulting in an axially wound curved bobbin. The resulting current transformer may limit effective CT turns ratio error, limit error from the gap variance where the core laminates open for installation on a primary conductor, limit error from temperature variations of the CT mutual inductance, and limit error from the placement of the primary conductor without the need for specialty toroidal winding equipment.

Figure 8:
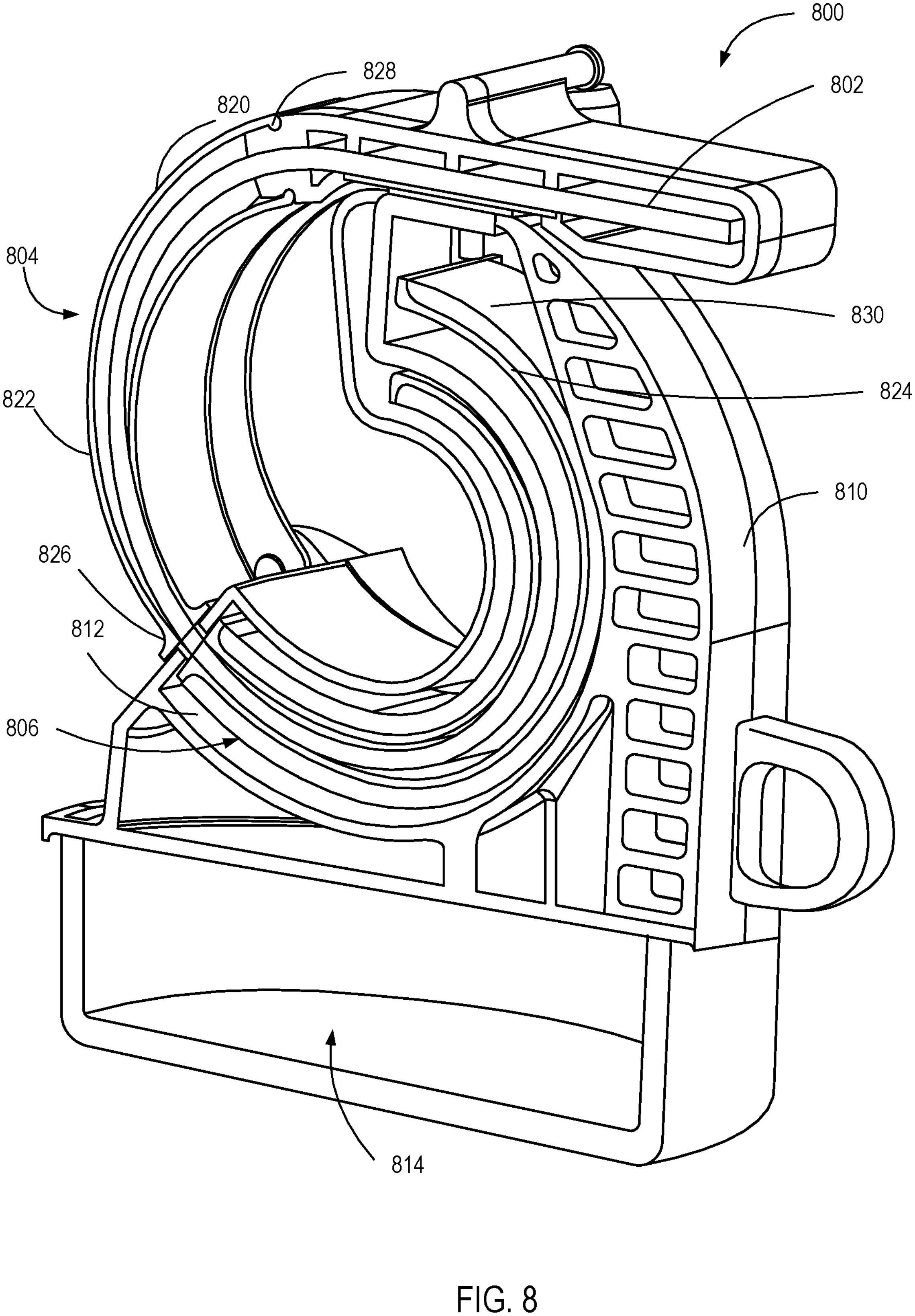
FIG. 8 illustrates a cross sectional view of a low-leakage flexible current transformer with an extended flexible bobbin for weatherproofing.

FIG. 8 illustrates a cross sectional view of a low-leakage flexible CT 800 partially housed within an enclosure 810. The enclosure 810 may provide weatherproofing for a first portion 806 of the low-leakage flexible CT 800, and the flexible bobbin 820 may extend beyond the enclosure 810 and provide weatherproofing for an exposed portion 804 of the low-leakage flexible CT 800.

As shown, the low-leakage flexible CT 800 may comprise a pre-formed core 802, a flexible bobbin 820, and an axially wound secondary winding 830. The pre-formed core 802 may be semi-rigid to allow the pre-formed core 802 to be bent to open the low-leakage flexible CT 800. The first portion 806 of the low-leakage flexible CT 800 may be contained within a first chamber 812 that is sized and shaped to receive the first portion 806. The first chamber 812 may provide protection from rain, snow, hail, and sun. A second chamber 814 may protect electronics, cables, and/or IEDs coupled to the low-leakage flexible CT 800.

The enclosure 810 may be made of a rigid material, such as plastic. The rigidity may provide protection to the low-leakage flexible CT 800. However if the whole low-leakage flexible CT 800 was housed within a rigid enclosure, the pre-formed core 802 would be unable to bend. Therefore, the exposed portion 804 remains exterior of the enclosure 810 to preserve the flexibility of the pre-formed core 802.

The exposed portion 804 is subject to environmental conditions. In some embodiments, the flexible bobbin 820 may cover and seal the exposed portion 804. For instance, as shown, the flexible bobbin 820 may include an unwound portion 822 and a wound portion 824. The unwound portion 822 may have no secondary winding and encompass a portion of the core 802 outside of the enclosure 810. In some embodiments, the flexible bobbin 820 may comprise seals 826, 828 to protect the exposed portion 804 of the low-leakage flexible CT 800 and seal the first chamber 812 of the enclosure 810. The secondary winding may be positioned on the wound portion 824, and the wound portion 824 may encompass a portion of the core 802 inside of the enclosure 810. Thus, the secondary winding 830 may be protected by the housing 810 and the unwound portion 822 of the flexible bobbin 820 may protect exposed portion 804 of the low-leakage flexible CT 800.

Figure 9:
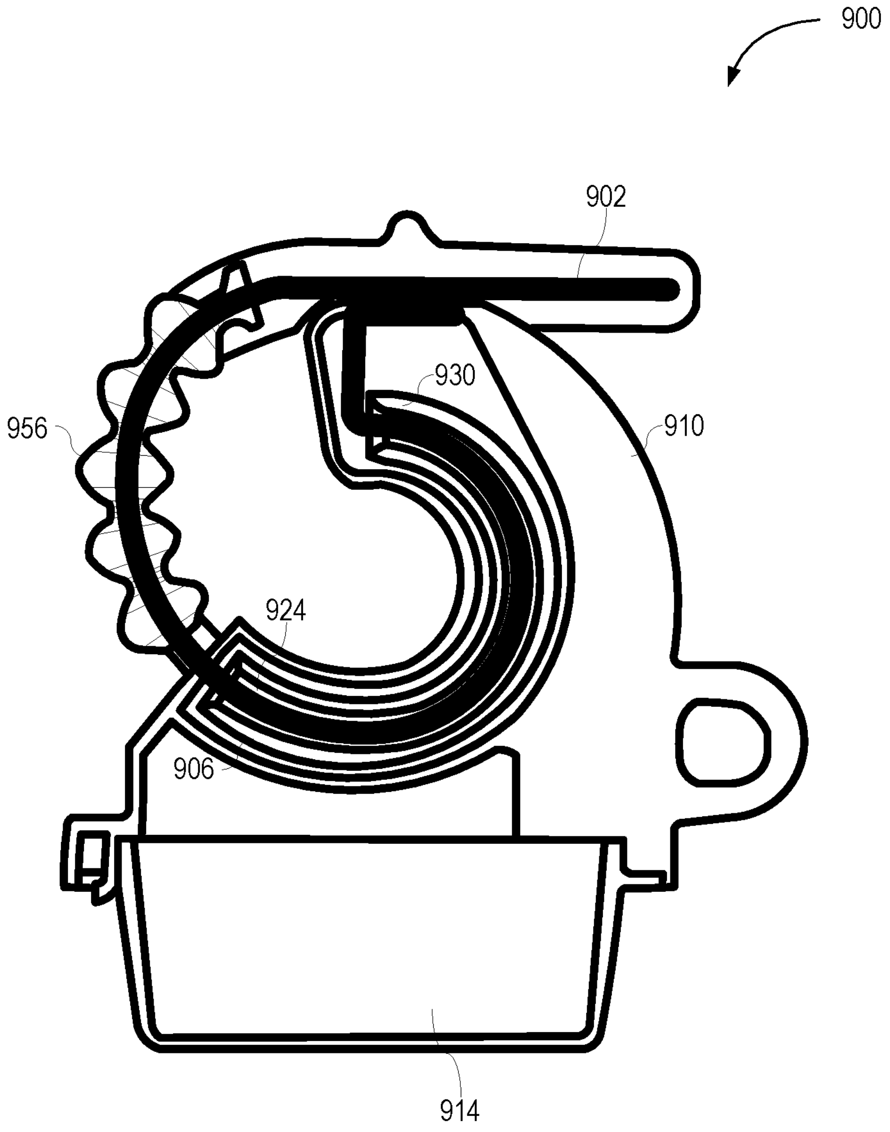
FIG. 9 illustrates a cross sectional view of a low-leakage flexible current transformer including flexible weatherproofing.

FIG. 9 illustrates a cross sectional view of another embodiment of a low-leakage flexible CT 900 at least partially housed within enclosure 910. The enclosure 910 may provide weatherproofing for a first portion 906 of the low-leakage flexible CT 900. The low-leakage flexible CT 900 may include a second portion extending through a flexible weatherproofing 956. The flexible weatherproofing 956 may be formed with flexible bellows. The low-leakage flexible CT 900 may include a pre-formed core 902, a flexible bobbin 924, and secondary winding 930, similar to several of the embodiments described herein. In one embodiment, the first portion 906 of the low-leakage flexible CT within the housing 910 may include a portion of the pre-formed core 902, the flexible bobbin 924, and the secondary winding 930. In other embodiments, the flexible bobbin 924 and/or the secondary winding 930 may extend from the housing 910 into the flexible weatherproofing 956. In one embodiment, the flexible bobbin 924 is formed from the same piece of material as the flexible weatherproofing 956.

Any methods disclosed herein include one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

The components of the disclosed embodiments, as generally described and illustrated in the figures herein, could be arranged and designed in a wide variety of different configurations. Thus, the embodiments and methods of the disclosure are not intended to limit the scope of the disclosure, as claimed, but are merely representative of possible embodiments of the disclosure.

Similarly, it should be appreciated by one of skill in the art with the benefit of this disclosure that in the above description of embodiments, various features are sometimes grouped together in a single embodiment, figure, or description thereof for the purpose of streamlining the disclosure. This method of disclosure, however, is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. It will be apparent to those having skill in the art that changes may be made to the details of the above-described embodiments without departing from the underlying principles of the present disclosure.

It will be understood by those having skill in the art that changes may be made to the details of the above-described embodiments without departing from the underlying principles of the invention. Embodiments of the invention in which an exclusive property or privilege is claimed are defined as follows.

What is claimed is:

1. A method of manufacturing a current transformer comprising:
providing a pre-formed core by shaping a core to form a loop;
obtaining a flexible bobbin comprising a duct extending through the flexible bobbin;
axially winding a wire around the flexible bobbin to form a secondary winding; and
sliding the secondary winding, onto the pre-formed core, wherein the pre-formed core is inserted through the duct of the flexible bobbin and the secondary winding conforms to a shape of the pre-formed core.

2. The method of claim 1, further comprising inserting a spacer in the duct of the flexible bobbin prior to axially winding the wire.

3. The method of claim 1, wherein obtaining the flexible bobbin comprises constructing the flexible bobbin.

4. The method of claim 3, wherein constructing the flexible bobbin comprises molding one continuous rubber member.

5. The method of claim 3, wherein constructing the flexible bobbin comprises layering rubberized filament to form molding one continuous rubberized member.

6. The method of claim 1, wherein the current transformer is configured for a primary winding to be positioned in an area surrounded by the secondary winding and a secant line from a first end to a second end of the secondary winding.

7. The method of claim 1, wherein shaping the pre-formed core to form the loop comprises shaping the pre-formed core to form in an elliptical shape.

8. The method of claim 7, wherein sliding the secondary winding onto the pre-formed core comprises positioning the secondary winding to conform along a curve of the pre-formed core to form a primary coupling zone within the loop comprising an area surrounded by the wire and a secant line from a first end to a second end of the wire.

9. The method of claim 1, wherein shaping the pre-formed core to form the loop comprises shaping the pre-formed core to form at least two opposing flat regions coupled by a curve.

10. The method of claim 9, wherein sliding the secondary winding onto the pre-formed core comprises positioning the secondary winding to conform along the curve of the pre-formed core to form a primary coupling zone within the loop comprising an area surrounded by the wire and a secant line from a first end to a second end of the wire.

11. A method of manufacturing a current transformer comprising:
providing a pre-formed core by shaping a core to form a loop with at least two transverse flat regions coupled by a curve;
obtaining a flexible bobbin comprising a duct extending through the flexible bobbin;
axially winding a continuous length of wire around the flexible bobbin to form a secondary winding; and
placing the secondary winding onto at least a portion of the pre-formed core, wherein the pre-formed core is inserted through the duct of the flexible bobbin and the secondary winding conforms to a shape of the pre-formed core with a first end and a second end of the secondary winding positioned at an equivalent chord of an elliptical shape, the flexible bobbing comprising a winding track, the flexible bobbin conforming to a shape of the pre-formed core.

12. The method of claim 11, wherein the continuous length of wire wound around the flexible bobbin conforms along a curve of the pre-formed core to form a primary coupling zone within the loop comprising an area surrounded by the continuous length of wire and a secant line from a first end to a second end of the continuous length of wire.

* * * * *